(12) United States Patent
Rauber et al.

(10) Patent No.: US 8,219,914 B2
(45) Date of Patent: Jul. 10, 2012

(54) SYSTEMS AND METHODS FOR GENERATING PERSONALIZED DYNAMIC PRESENTATIONS FROM NON-PERSONALIZED PRESENTATION STRUCTURES AND CONTENTS

(75) Inventors: Nicolas Rauber, Colombes (FR); Davy Ea, Paris (FR); Eric Chatry, Bois Colombes (FR)

(73) Assignee: Moet Hennessy (FR)

( * ) Notice: Subject to any disclaimer, the term of this patent is extended or adjusted under 35 U.S.C. 154(b) by 0 days.

(21) Appl. No.: 12/678,656

(22) Filed: Mar. 17, 2010

(65) Prior Publication Data
US 2011/0004563 A1 Jan. 6, 2011

Related U.S. Application Data

(63) Continuation-in-part of application No. PCT/EP2008/062376, filed on Sep. 17, 2008, which is a continuation of application No. 11/901,461, filed on Sep. 17, 2007, now abandoned.

(51) Int. Cl.
*G06F 3/00* (2006.01)
(52) U.S. Cl. ........................ 715/730; 715/762
(58) Field of Classification Search .................. 715/730, 715/762, 764, 789
See application file for complete search history.

(56) References Cited

U.S. PATENT DOCUMENTS

| | | | |
|---|---|---|---|
| 7,213,202 B1 * | 5/2007 | Kagle | 715/235 |
| 7,248,231 B2 * | 7/2007 | Hurley et al. | 345/2.1 |
| 7,555,551 B1 * | 6/2009 | McCorkendale et al. | 709/225 |
| 2002/0165906 A1 * | 11/2002 | Ricart et al. | 709/203 |
| 2003/0122863 A1 * | 7/2003 | Dieberger et al. | 345/730 |
| 2004/0046789 A1 * | 3/2004 | Inanoria | 345/748 |
| 2004/0186857 A1 * | 9/2004 | Serlet et al. | 707/200 |
| 2005/0273693 A1 * | 12/2005 | Peterson | 715/500.1 |
| 2007/0186167 A1 * | 8/2007 | Anderson | 715/730 |
| 2007/0192457 A1 * | 8/2007 | Ervin | 709/223 |

OTHER PUBLICATIONS

"Adobe Flash"—Wikipedia, the free encyclopedia; http://en.wikipeida.org/wiki/Adobe_Flash; pp. 1-13.
Macromedia; white paper "Delivering Enterprise Applicants, Content, and Communications with the Flashâ Platform" by Vikrant Karvir; Jun. 2005; 24 pages.
"A Concise Guide to the SWF File Format", SWF File Format Specifications; http://www.the-labs.com/MacromediaFlash/SWF-Spec/SWFfileformat.html; pp. 1-8.
"SWF File Reference"; http://www.minigui.com/flashplayer/swf_toc1_4/SWFfilereference.html; pp. 1-45.

(Continued)

*Primary Examiner* — Omar Abdul-Ali
(74) *Attorney, Agent, or Firm* — Lerner, David, Littenberg, Krumholz & Mentlik, LLP

(57) ABSTRACT

Computer system comprising master storage containing master presentation data having a master nodal structure and master contents associated with content structure nodes, structure editor capable of copying master nodal structure into a personalized data structure in a dedicated read/write storage and of selectively changing the copied master nodal structure into a personalized nodal structure in response to user inputs, personalized nodal structure comprising all or part of the nodes of the master nodal structure, contents editor capable of copying a master content into personalized data structure in dedicated read/write storage and of selectively changing the copied master content into a personalized content in response to user inputs, dynamic presentation generator for generating a personalized presentation by accessing personalized data structure, determining which content nodes in structure belong to personalized presentation, for such content nodes selectively accessing master contents or personalized content if the latter is present in personalized data structure.

31 Claims, 9 Drawing Sheets

OTHER PUBLICATIONS

"Macromedia Flash FLA Project File Format"; Sustainability of Digital Formats Planning for Library of Congress Collections; http://www.digitalpreservatin.gov/formats/fdd/fdd000132.shtml; pp. 1-4.

Adobe—Player Licensing : File Format Specification FAQ; http://www.adobe.com/licensing/develper/fileformat/faq/; pp. 1-2.

* cited by examiner

```
<LAUNCH_ID>1</ LAUNCH_ID>
<PRESENTATION>
        <NOM><[CDATA[New Presentation]]></NOM>
        <ID>1</ID>
        <DATE>09/08/2007 17:35:47</ DATE >
        <PATH>MHPS\COCKTAIL\</PATH>
        <LANGUE>English</LANGUE>
        <EDITABLE>true</EDITABLE>
</PRESENTATION>
<PRESENTATION>
        <NOM><[CDATA[New Presentation]]></NOM>
        <ID>2</ID>
        <DATE>29/08/2007 09:14:42</ DATE >
        <PATH>MHPS\COCKTAIL\</PATH>
        <LANGUE>English</LANGUE>
        <EDITABLE>true</EDITABLE>
</PRESENTATION>
```

FIG. 4

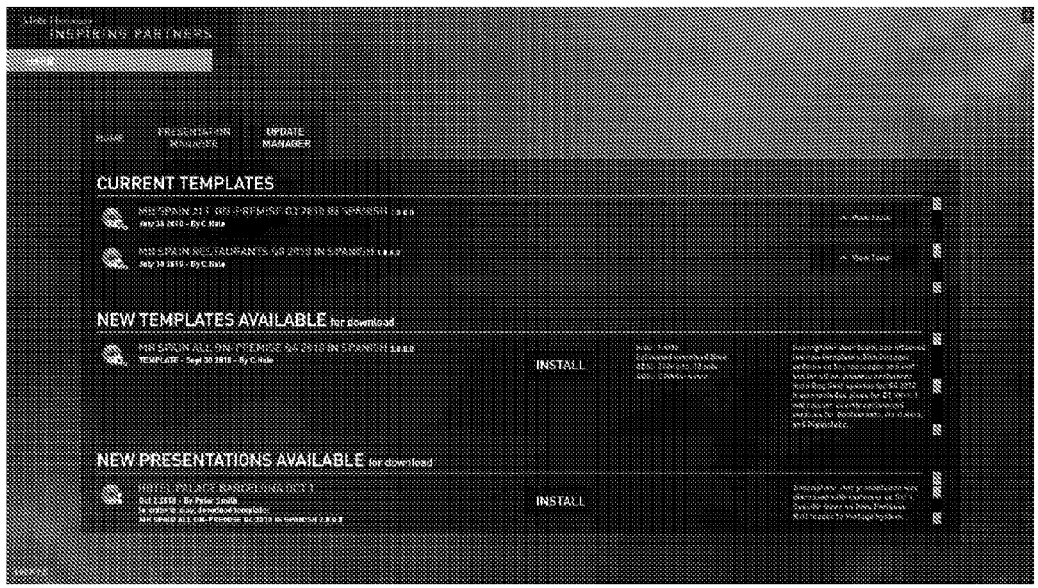

FIG. 5

```
<item enabled="on" file="00_02" duration="2" label="Personal content (1/3)"
printable="on" />
```

FIG. 6

```
<?xml version="1.0" encoding="UTF-8" ?>
<contenu>
    <txt mc="mc_1.mc_1._sstitre_txt">
    <![CDATA[ <TEXTFORMAT LEADING="2"><P ALIGN="LEFT"><FONT FACE="DIN-Medium"
    SIZE="14" COLOR="#31C818" LETTERSPACING="0"
    KERNING="0">1/3</FONT></P></TEXTFORMAT> ]]></txt>

<txt mc="mc_2.mc_1.txt_1"><![CDATA[ INTRODUCTION ]]></txt>

<txt mc="mc_6.mc_1._titre_txt"><![CDATA[ <TEXTFORMAT LEADING="2"><P
    ALIGN="LEFT"><FONT FACE="DIN-Light" SIZE="26" COLOR="#FE1753"
    LETTERSPACING="0" KERNING="0">PERSONAL CONTENT
    </FONT></P></TEXTFORMAT>]]></txt>

<txt mc="mc_8.mc_1.txt_1"><![CDATA[<TEXTFORMAT LEADING="2"><P
    ALIGN="LEFT"><FONT FACE="DIN-Medium" SIZE="21" COLOR="#FE1753"
    LETTERSPACING="0"
    KERNING="0"><B>TITLE</B></FONT></P></TEXTFORMAT><TEXTFORMAT LEADING="2"><P
    ALIGN="LEFT"><FONT FACE="DIN-Medium" SIZE="21" COLOR="#FE1753"
    LETTERSPACING="0" KERNING="0"></FONT></P></TEXTFORMAT><TEXTFORMAT
    LEADING="2"><P ALIGN="LEFT"><FONT FACE="DIN-Bold" SIZE="14" COLOR="#FE1753"
    LETTERSPACING="0" KERNING="0">SUBTITLE</FONT></P></TEXTFORMAT><TEXTFORMAT
    LEADING="2"><P ALIGN="LEFT"><FONT FACE="DIN-Medium" SIZE="16"
    COLOR="#FFFFFF" LETTERSPACING="0" KERNING="0">Loreum ipsum dolor si amet,
    consectetuer adipiscing elit, sed diam nonummy nibh euismod tincidunt ut
    loareet dolore magna aliquam erat voluptat. Ut wisi enim ad minim veniam,
    quis nostrud exerci tation ullamcorper suscipit loboris nisl ut
    aliquip</FONT></P></TEXTFORMAT><TEXTFORMAT LEADING="2"><P
    ALIGN="LEFT"><FONT FACE="DIN-Medium" SIZE="16" COLOR="#FFFFFF"
    LETTERSPACING="0" KERNING="0"></FONT></P></TEXTFORMAT><TEXTFORMAT
    LEADING="2"><P ALIGN="LEFT"><FONT FACE="DIN-Bold" SIZE="14" COLOR="#FE1753"
    LETTERSPACING="0" KERNING="0">SUBTITLE</FONT></P></TEXTFORMAT><TEXTFORMAT
    LEADING="2"><P ALIGN="LEFT"><FONT FACE="DIN-Medium" SIZE="16"
    COLOR="#FFFFFF" LETTERSPACING="0" KERNING="0">Loreum ipsum dolor si amet,
    consectetuer adipiscing elit, sed diam nonummy nibh euismod tincidunt ut
    loareet dolore magna aliquam erat voluptat. Ut wisi enim ad minim veniam,
    quis nostrud exerci tation ullamcorper suscipit loboris nisl ut
    aliquip</FONT></P></TEXTFORMAT><TEXTFORMAT LEADING="2"><P
    ALIGN="LEFT"><FONT FACE="DIN-Medium" SIZE="16" COLOR="#FFFFFF"
    LETTERSPACING="0" KERNING="0"></FONT></P></TEXTFORMAT><TEXTFORMAT
    LEADING="2"><P ALIGN="LEFT"><FONT FACE="DIN-Bold" SIZE="14" COLOR="#FE1753"
    LETTERSPACING="0" KERNING="0">SUBTITLE</FONT></P></TEXTFORMAT><TEXTFORMAT
    LEADING="2"><P ALIGN="LEFT"><FONT FACE="DIN-Medium" SIZE="16"
    COLOR="#FFFFFF" LETTERSPACING="0" KERNING="0">Loreum ipsum dolor si amet,
    consectetuer adipiscing elit, sed diam nonummy nibh euismod tincidunt ut
    loareet dolore magna aliquam erat voluptat. Ut wisi enim ad minim veniam,
    quis nostrud exerci tation ullamcorper suscipit loboris nisl ut
    aliquip</FONT></P></TEXTFORMAT> ]]></txt>
</contenu>
```

SYSTEMS AND METHODS FOR GENERATING PERSONALIZED DYNAMIC PRESENTATIONS FROM NON-PERSONALIZED PRESENTATION STRUCTURES AND CONTENTS

CROSS REFERENCE TO RELATED APPLICATIONS

The present application is a Continuation-in-Part of International Application No. PCT/EP2008/062376, filed Sep. 17, 2008, published in English, which is a Continuation of U.S. patent application Ser. No. 11/901,461, filed Sep. 17, 2007. The entire disclosures of these applications are incorporated by reference herein.

The present invention generally relates to a system and method for generating personalized dynamic presentations.

BACKGROUND OF THE INVENTION

Computer systems equipped with software for generating dynamic multimedia presentations, are well known in the art.

There are several pieces of software on the market which are dedicated to multimedia presentations. The most widespread is Microsoft PowerPoint®. PowerPoint runs on personal computers and is widely used by business people, educators, students, and trainers and is among the most prevalent forms of persuasion technology. As a part of Microsoft Office, Microsoft Office PowerPoint has become the world's most widely used presentation program.

In this software, as in most other presentation software, text, graphics, movies, and other objects are positioned on individual pages or "slides". The "slide" analogy is a reference to the slide projector, a device which has become somewhat obsolete due to the use of PowerPoint and other presentation software. Slides can be printed, or (more often) displayed on-screen and navigated through at the command of the presenter.

PowerPoint provides two types of movements. Entrance, emphasis, and exit of elements on a slide itself are controlled by what PowerPoint calls Custom Animations. Transitions, on the other hand are movements between slides. These can be animated in a variety of ways. The overall design of a presentation can be controlled with a master slide; and the overall structure, extending to the text on each slide, can be edited using a primitive outliner.

Sharing a PowerPoint presentation with others generally means sending the whole file by email, or copying the whole presentation file on a removable storage such as a USB memory key for reading by another computer.

And the richer the presentation will be, the bigger will be this whole file, which makes sharing difficult. In this regard, there is no convenient way to only send changes from an older version of a given presentation.

Adobe Flash® technology offers another way to make presentations. Flash animation possibilities combined with interactivity bring more liberty to enrich presentation with visuals, texts, videos.

With Internet democratization and broadband connections, Flash applications are now widely used. Even if these applications are conceived to be shown on screen, they can also be printed.

Thanks to the large possibilities offered by this technology, there is no limit but the imagination to make any kind of transition animations.

Although Flash presentations are now very widespread on the Internet, the underlying application design often provides static contents only, which means contents are not impacted by external data.

Nevertheless, The up-to-date Flash technology allows to build a Flash application based on dynamic contents, based on the ActionScript programming language which allows to manipulate variables, store and display data, etc.

Indeed, Flash-based applications (usually from websites) provide dynamic contents through a back office or administration page, usually in two steps: first the database where information is stored is modified by an administrator through at the back office level; then the information is dynamically read by a Flash application and displayed in front office. Thus a single Flash file requested by the user will change its state according to external data collected from the back office.

Although this presentation generating software is nowadays very thorough and capable, there is no convenient way for a user to modify (such as personalize) an existing presentation or for exchanging personalized presentations between users without the requirement of broadband communications or large physical mass storage compatible with the large size of such files.

More particularly, when an existing presentation is to be modified, adapted, or personalized to a specific context or public, it is necessary to rely on specific editing tools which can be mastered only by skilled people and the use of which can be fastidious and time consuming.

And this needs to be done each time a change, even a minute change, is to be brought to the presentation.

In addition, volume of presentation data can be quite large, in particular when multiple video sequences are involved (sometimes several hundreds of megabytes), and having numerous personalized presentations involve that a large disk space is required, and that any transmission of presentations on a network, e.g. via email, is virtually impossible.

SUMMARY OF THE INVENTION

The present invention seeks to mitigate these drawbacks, and aims at offering a presentation tool that allows easy building or personalized presentations from a master presentation, even by non skilled persons, and that allows easy transfer of personalized presentation data between users having access to the same master presentation data.

To this end, the present invention provides according to a first aspect a computer system for generating a dynamic presentation, comprising:

a master storage containing master presentation data having a master nodal structure and master contents associated with content nodes of said structure, a structure editor capable of copying said master nodal structure into a personalized data structure in a dedicated read/write storage and of selectively changing the copied master nodal structure into a personalized nodal structure in response to user inputs, wherein said personalized nodal structure comprises all or part of the nodes of the master nodal structure, a contents editor capable of copying a master content into said personalized data structure in said dedicated read/write storage and of selectively changing the copied master content into a personalized content in response to user inputs, a dynamic presentation generator for generating a personalized presentation by accessing said personalized data structure, determining which content nodes in said structure belong to personalized presentation, and for any such content node selectively accessing master contents or personalized content if the latter is present in said personalized data structure.

Preferably, said contents editor and said presentation generator share common display generation tools, whereby said contents editor operates in what-you-see-is-what-you-get mode. This allows the user to immediately visualize any personalization made to the contents, without having to make any edition in the somewhat complex file structures.

In order to make the changes to the structure easy for the user, again without entering into the file representing the presentation structure, said structure editor comprises a display generator for displaying labels of nodes of the master nodal structure and user-input sensitive graphic items associated to each node label for selectively declaring each associated node as enabled or disabled in the personalized nodal structure.

Preferably, said master nodal structure comprises a tree structure file where each content node of the structure has an enabled/disabled tag, and wherein the structure editor is capable of changing the tag values depending on the user inputs made on the graphic items.

Preferably, said master contents include master presentation template data toward which point template pointers associated to structure nodes, and contents data towards which point content pointers associated to said template data, and wherein said presentation generator is capable of accessing master presentation template data pointed by an enabled node, of checking whether a corresponding personalized content is contained in said dedicated storage, if so using said personalized content for the presentation, and if not accessing master content located in the master storage for the presentation.

Conveniently, said nodal structures and said contents are tag-based arborescent files such as XML files.

It is further advantageous that the system comprises a plurality of personalization data sets, each comprising a personalized nodal structure and personalized contents, and a selector for selecting one among said sets. In this manner, the user can build different personalized presentations and select the one to be used in a specific instance.

Typically, the master storage is a remote medium storage unit, such as a central server, and said dedicated read/write storage is a different storage unit such as the computer system internal hard disk. In this manner, a plurality of users can simultaneously connect to the same server, for example through the Internet, and each user is capable of making his/her own personalized presentations.

However, the invention is not limited to an online operation. Contents of the master storage, and especially the content which are frequently used, can be downloaded and locally stored in said read/write storage to enable offline operation, for example to enable a user to work with a laptop on travel, etc.

The master storage may also be of another type, for example a read-only removable medium storage unit, such as a CD-ROM, a DVD-ROM, or an USB Key.

Besides, the structure editor, the contents editor and the dynamic presentation generator can be made available as a downloadable application. An online install program may be provided to the users, which downloads from a central server the application and possibly some basic contents for installation on the local computer.

The system may further comprise a communication node allowing the application installed in the user computer to upload information from said computer to the central server. This information thus becomes available for every other user preferably after an administrator-level authorization. In this manner, different users can share presentations, without the need to transfer from one computer system to another large quantities of information, since only what was modified is transferred.

It is further preferred that the master storage contains both master presentation data and localized presentation data (in particular with text and speech in different languages). This allows, from the same starting materials, to easily build personalized presentations in different languages.

In this case, a language selector allows to use as master nodal structure and master contents the localized structure and contents.

In such a situation, the system is adapted, for each content intended to belong to a presentation, to first check whether a personalized content exists, if so to use such personalized content, and if not to check whether a localized content exists, if so to use such localized content, and if not to use a master content.

The computer system may further comprise a database editor capable of copying at least part of a master database contained in the master presentation data into said dedicated read-write storage and to personalize data of said copied database in response to user inputs, wherein said presentation generator is capable of dynamically using said personalized data for the presentation.

In such manner, to a given presentation can be attached any kind of personalized data to be dynamically used by the presentation generator or by any other software.

Preferably, dynamic presentation generator comprises a Flash™ type presentation generator.

According to a second aspect, the present invention provides a method for generating a personalized dynamic presentation in a computer system having a master storage containing master presentation data having a master nodal structure and master contents associated to the nodes of said nodal structure, defining together a non-personalized dynamic presentation, said method comprising:

copying said master nodal structure from said master storage to a personalized data structure contained in a dedicated read/write storage, editing said copied structure into a personalized nodal structure in response to user inputs, wherein said personalized nodal structure comprises all or part of the nodes of the master nodal structure, for at least one of said nodes, copying a master content to said personalized data structure contained in said dedicated read/write storage, editing said copied master content into a personalized content in response to user inputs, and generating said personalized dynamic presentation by accessing said personalized data structure, determining which content nodes in said structure belong to the personalized presentation, and for any such content node selectively accessing master contents or personalized content if the latter is present in said personalized data structure.

According to a third aspect, the present invention provides a method for transmitting a personalized dynamic presentation from a first computer system to second another computer system, comprising the steps of:

providing each computer system with a master storage medium containing similar non-personalized dynamic presentation data, at said first computer system, assembling a personalized data structure generated by the method as defined above into a single data package.

transmitting said package from said first computer system to said second computer system via a standard communications process, at said second computer system, disassembling said single data package into said personalized data structure, and storing said structure in a dedicated read/write storage, whereby a method as defined above can be performed in said second computer system for generating said personalized dynamic presentation or a similar one from said non-personalized dynamic presentation data and said personalized data structure.

By this method, personalized presentations can easily be shared between user without fastidious and complex exchange of large volumes of information, and with a good reliability.

Advantageously, the package is not directly transmitted from said first computer to said second computer, but goes through the central server. This allows asynchronous data interexchange between users without the requirement of direct connections between them.

According to a fourth aspect of the present invention, a computer-based tool for assisting salespersons in the presentation of products/services on offer is provided, which comprises:

- a storage containing a master product/service presentation including data associated with a number of products/services on offer,
- an editor for changing the master product/service presentation into a personalized product presentation and for storing in a personalization data set representative of the changes,
- a dynamic presentation generator for reading said master product presentation in said storage and said personalization file in order to generate a personalized presentation for selected products/services, where presentation contents can further be personalized, as entirely defined by the personalization data set.

According to a fifth aspect, the present invention provides a method for assisting salespersons in the presentation of products/services on offer, comprising:

- providing to each salesperson a computer-readable data storage medium containing a master product/service presentation including data associated with a number of products/services on offer,
- providing to each sales person a computer-based editor for changing the master product/service presentation into a personalized product presentation and for storing in a personalization data set representative of the changes and accessible by said computer,
- providing to each salesperson a dynamic presentation generator for reading said master product presentation in said storage and said personalization file in order to generate a personalized presentation for selected products/services, as entirely defined by the personalization data set.

Preferably, said editor and said presentation generator are provided on said data storage medium for installation on the salesperson computer system. In this manner, a single medium such as a CD-ROM is provided to the salesperson without the need for high level of IT management.

Advantageously, the method comprises the following additional steps:

- providing to regional sales entity computer-readable data storage media each containing a plurality of master product/service presentations corresponding to products/services available in respective regions,
- providing the computer systems of salespersons in a given region with code limiting access by the editor and presentation generator to the master product/service presentation corresponding to said given region.

In this manner, an identical data storage medium can be provided to the various regional sales entities throughout the world, and at the same time a salesperson in a given region will be sure to present products/services that are effectively available in this region.

BRIEF DESCRIPTION OF THE DRAWINGS

The present invention will be more clearly understood from the following detailed description of a preferred embodiment thereof, made with reference to the appended drawings, in which:

FIG. 4 illustrates a presentation node in a XML structure, FIG. 5 shows the main display of a presentation manager allowing to create, edit, import, etc. presentations, FIG. 6 illustrates an item portion of a XML structure of a presentation, FIG. 10 shows an exemplary XML slide content with personalized text to be used by the system and method of the invention, FIGS. 12A and 12B illustrate two XML slide contents with different types of personalizations.

DETAILED DESCRIPTION OF A PREFERRED EMBODIMENT

Definitions

Figure 1A:
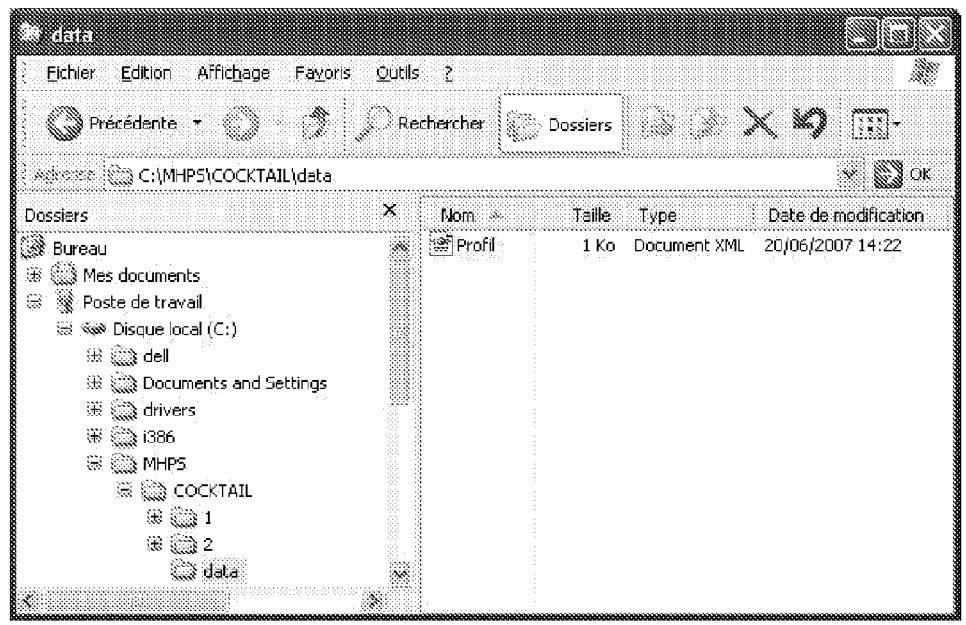
FIG. 1A to 1D illustrate different levels of a simplified folder structure of a personalized data set corresponding to a presentation.

In the practical embodiment of the invention as described hereinunder, the following abbreviations/acronyms are used:

SWF: a proprietary vector graphics file format produced by the Flash software from Adobe (formerly Macromedia). Intended to be small enough for publication on the web, SWF files can contain animations or applets of varying degrees of interactivity and function. SWF is also sometimes used for creating animated display graphics and menus for DVD movies, and television commercials.

The Flash program generates in a manner known per se SWF files as a compressed and non-editable final product, whereas it uses the .fla format for its editable working files (source: Wikipedia.org)

These file format specifications can be found under the following link:
http://www.adobe.com/licensing/developer/fileformat/faq/

Adobe Flash (abbreviated in Flash): refers to both the Adobe Flash Player, and to the Adobe Flash Professional multimedia authoring program. Adobe Flash Professional is used to create content for the Adobe Engagement Platform (such as web applications, games and movies, and content for mobile phones and other embedded devices). The Flash Player, developed and distributed by Adobe Systems, is a client application available in most common web browsers. It features support for vector and raster graphics, a scripting language called ActionScript and bi-directional streaming of audio and video. There are also versions of the Flash Player for mobile phones and other non-PC devices. (source: Wikipedia.org)

More information on the Flash Player can be found under the following link:
http://www.adobe.com/products/flashplayer/

Adode Integrated Runtime (Abbreviated in AIR), refers to a cross-platform runtime environment developed by Adobe Systems for building complex applications connected with the Internet (Rich Internet Applications, or RIA). This is an Adobe Flash based technology.

More information on Air can be found under the following link:
http://www.adobe.com/products/air/

ActionScript: a scripting language based on ECMAScript, primarily associated with scripting behavior of Adobe Flash applications. Currently in version 3.0, ActionScript has revolutionized the flash format, which initially offered little else than typical linear animation. With ActionScript, a Flash application can provide a high level of interactivity, which is a necessary component of modern web design. Applications developed using Adobe Flash or Adobe Flex will often use ActionScript for runtime manipulation of data and content. Other platforms, such as ColdFusion also support scripting with the ActionScript language.

More information regarding the use of Adobe Flash authoring program and the ActionScript language can be found under the following link:
http://livedocs.adobe.com/flash/9.0/main/

SWF2EXE software: a type of software which enables the creation of executable files from SWF files.

SWF files were originally designed for use in a web browser and required the Flash plug-in to be installed for the browser it is running on. However SWF files can be played outside of a web browser using the Adobe Flash Player, providing that the user has the Flash Player installed. The Adobe Flash Player provides an option to wrap the SWF file into a standalone executable which does not require the Flash Player to be installed for it to run successfully. This can be done by running the Flash projector, and in the File menu select 'Create projector'. Using this description, the Flash Player can be thought of as a SWF2EXE program.

Since the option to create standalone presentations (or self executing Flash movies) from Flash was introduced, there have been several SWF2EXE programs, available commercially and as freeware, which claim to be able to create standalone executables from SWF files and at the same time extend the functionality of Flash. For example, these programs offer access to the file system to save to a file—something which cannot be done with Flash alone. (source: Wikipedia.org)

Introduction

In its currently preferred practical implementation, the computer-based dynamic presentation system and method according to the present invention is based on a combination of SWF or AIR files (made with a Flash authoring tool integrating Action Script development environment plus multiple graphic designs), XML files, and Databases, warped into commercial "Zinc SWF2EXE" solution available from Multimedia Limited (MDM), United Kingdom, and into the AIR Framework.

Starting Data Structures

The system of the present invention operates from a master dynamic presentation data stored on a read/write medium, typically the computer system internal hard disk of the user, or in a delocalized read only medium, typically a central server.

By "presentation", it is meant here any type of multimedia presentation including contents such as text, static images, video, sound, and which can perceived as a time succession of "slides" each having its own contents.

These master data can include different master localized versions each defining a master or model presentation in different languages in which the presentation is to be delivered (in particular text and speech).

These master localized versions can be attached to a root master content which is for instance the English version. Each master localized version includes a pack of XML files used as a basis for a presentation. The localized versions are stored in a data folder associated to the application on the medium, except for files which are not to be localized (e.g. images) which are stored in the root master contents.

The data folder associated to a localized version contains all localized XML slide files (localized master content) and a localized master nodal structure. The localized Master Nodal Structure can refer to different SWF/XML files using a "file" attribute as will be explained in greater detail in the following.

The master nodal structure is contained in various XML documents which define a hierarchical organization of presentation items (the above-mentioned slides), said master nodal structure being stored in a "menu" folder of the master localized version.

Each item node of the master nodal structure may refer to a file belonging to a localized master content also stored in the master localized structure.

One aspect of the present invention is to allow a user, from these master data, to create a personalized dynamic presentation, wherein a set of personalized data are created and stored in a read/write storage unit of the system, such as the system internal hard disk drive, without requiring the duplication of large presentation data. This set of personalization data is stored in a set of folders, the root of which will be called the local root folder in the following description.

Every time the presentation is modified, a new .xml file is created or updated, bearing in mind that to any .swf file always corresponds one .xml file per presentation.

Basic Operation

The dynamic presentation program embodying the method of the present invention comprises the following basic functions.

When the system is launched, a display is generated for input of user name and password for entitled use of the program.

After checking that the user name is registered and the password is correct, the program checks whether a date which has been associated to the master presentation data and which is stored therewith is consistent with the current system date.

This allows to possibly detect that a master presentation is obsolete, an in such case an error message is displayed, informing the user that he should obtain a more up-to-date version of the master presentation.

Then, the program checks whether a local root folder is present on the hard disk drive of the computer system, meaning that a personalized presentation has been already initiated in the same system.

This local root folder, the contents of which will be described in greater detail hereinafter, is expected by the program to be found along a given path in the main hard drive of the user's computer (e.g. C:\MHPS\COCKTAIL\ in the present example).

If the program does not find a local root folder, the program then automatically creates such a root folder as well as sub-folders including among others a subfolder "data" and, in the "data" folder, an empty XML file named "profil.xml" file.

FIGS. 1A to 1D shows an example of the COCKTAIL root folder and part of its hierarchical structure (according to a Windows® type operating system in the present species).

The sub-folders named "1", "2" contained in the COCKTAIL folder as shown in FIG. 1A are presentation folders each corresponding to a personalized presentation.

The COCKTAIL folder further contains a "data" folder which itself contains an XML file named "profil.xml" which is used by the program as will be later explained.

Figure 1B:
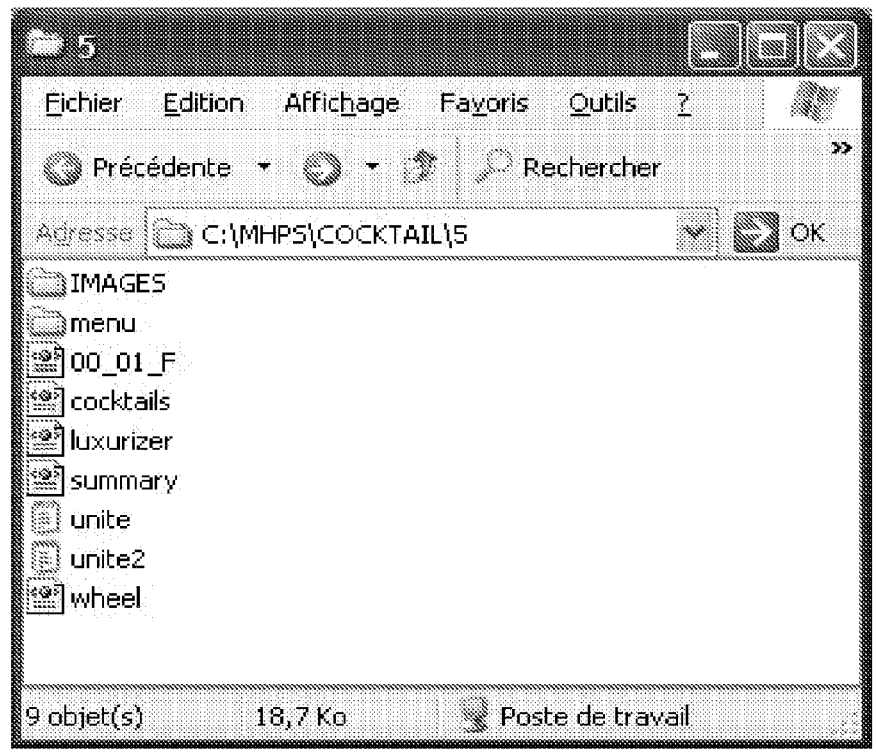

As illustrated in FIG. 1B, a folder presentation (here a folder named "5") itself contains several sub-folders.

A sub-folder "IMAGES" contains personalization images such as .jpeg files which are to be used instead of a master image in the personalized presentation. FIG. 1D shown an example of the contents of such "IMAGES" folder, with an image called 00_01.jpg.

A sub-folder "menu" contains the personalized "menu.xml" file as mentioned in the foregoing and as will be described in greater detail in the following.

The "5" folder further contains a XML file corresponding to a personalized slide and named 00_01_F.xml in the present example. This XML file contains personalization data including in particular personalized text and personalized text attributes for the relevant slide.

Advantageously, the names of the .jpg or .xml personalization files (or other file types) are identical to the names of the .swf slide template files contained in the master data, to that the program can find in a very straightforward manner the personalization files corresponding to the respective slides.

Figure 1C:
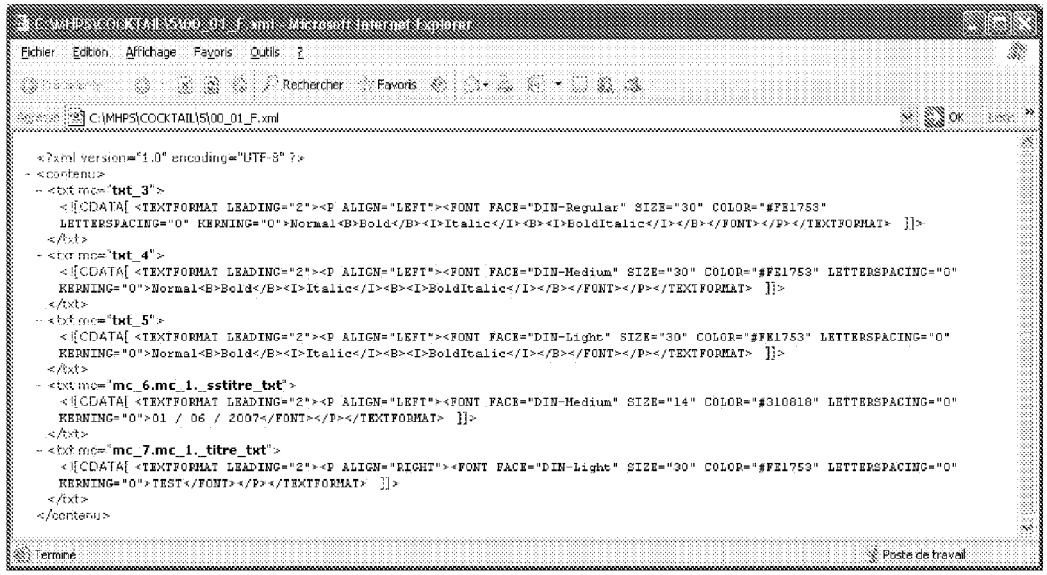
Figure 1D:
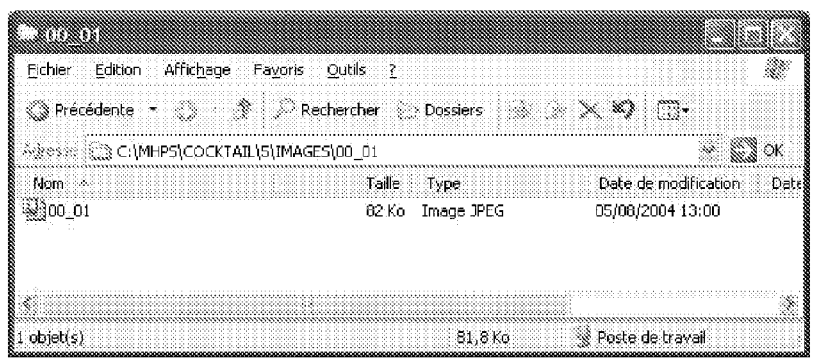
Figure 2:
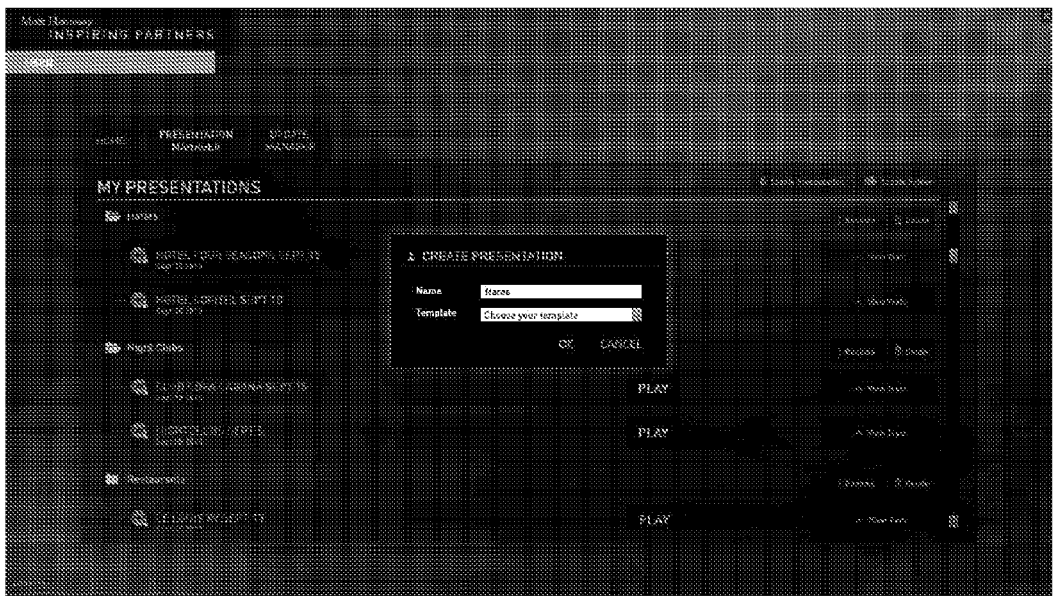
FIG. 2 shows a new presentation display generated for creating a new presentation.
Figure 3:
FIG. 3 shows the first slide of a template presentation that can be personalized.

An example of such XML slide file is shown in FIG. 1C, and corresponds to the slide display as shown in FIG. 3. Basically, this file is derived either from the master .swf slide file contained in the master data, or from a pre-existing .xml personalization file, with personalized or further personalized items in the relevant places. It this example, a text field present in the XML file contains some text with has been personalized (here the "TEST" text string come in replacement of the "CLIENT NAME" text string present in the master XML file and practically intended to be replaced with the name of the client to whom the personalized presentation is intended).

Through a mechanism that will be described later in the present description, the system would then display "TEST" in the place of "CLIENT NAME" in the slide displayed in FIG. 3.

After the launching step described above has been executed, a "presentation manager" part of the program (cf. infra) is then executed.

The presentation manager provides the user a number of presentation management actions to be done, and in particular he can:
 manage all the presentations made by him on his computer.
 download presentation templates and additional data for his presentations to contain new information.
 upload some of his presentations to the central server.
 be informed of any new information, presentation or date available for him on the central server.

This allows the user to create a personalized presentation derived from to a master localized version as identified by the language choice. (see infra chapters Master Presentation Creation: Presentation Creation and Master Localized Version).

If the program does find a local root folder, then it launches the current Active Presentation as defined by the contents of the "profil.xml" file contained in the "data" sub-folder of the root folder.

The "profil.xml" file contained in the "data" folder under the "COCKTAIL" folder is used to store presentation personalization data, i.e. presentation parameters corresponding to different presentations created by the user as will be described hereinafter, and to determine which among a plurality of presentation should be the active presentation, i.e. the presentation to be used. There is only one "profil.xml" file per type of presentation (a type of presentation being here COCKTAIL). A simple example of a "profil.xml" file with two presentation nodes is shown in FIG. 4.

When a presentation is created (cf. infra) or modified (cf. supra), the "profil.xml" file is updated with an additional presentation node of the type illustrated in FIG. 4.

The presentation node includes in the present species the following sub-nodes:
NOM: the specific presentation name as inputted by the user
ID: a unique presentation identification number
DATE: Creation date/Slide Manager modification date saved in the "profil.xml" file.
PATH: the local path for accessing the local root folder containing the "profil.xml" file.
LANGUE: designates a localized master version used to create the presentation. "LANGUE" for "LANGUAGE" can possibly be changed in "COUNTRY" or "REGION" so as to designate to which part of the world the presentation node is assigned: "localized" shall be here understood in a wide meaning. Preferentially, only one language per presentation node is foreseen, so that the presentation can be easily and quickly transmitted and downloaded, meaning the language is adapted to the country where the presentation shall be used.
EDITABLE (value true or false): editable/non-editable character of the presentation (EDITABLE IS always true for presentations created by users).

The "profil.xml" file also includes as shown in FIG. 4 a LAUNCH_ID node identifying which presentation, as designated by the following parameter, is active.

Presentation Manager

The presentation manager will now be described in greater detail.

Basically, this part of the computer program allows users to manage (i.e. create, rename, duplicate, modify, delete, import, send to someone else, . . . ) presentations in different ways.

A main display of the presentation manager is shown in FIG. 5. This display shows all existing presentations on a computer system. When the user clicks on a presentation name, the presentation manager updates the LAUNCH_ID attribute stored in the "profil.xml" file so that the location of the presentation can be found therefrom. The presentation then becomes the new active presentation.

The presentation manager allows renaming, duplicating, deleting, transmitting to another system, and reordering all presentations. All actions made by the user in the presentation manager result in a corresponding update of the "profil.xml" file under the active presentation node thereof and/or of the "profil.xml" file nodal structure.

The presentation manager can also alter presentation data files (deletion/duplication), as will be described hereinunder.

One main feature of the presentation manager is to allow editing the structure of the presentation. This is done through another program part forming a structure editor and called slide manager in the present example.

In the example illustrated in FIG. 5, two presentations are existing and listed in the display: the first one is highlighted, meaning that it is the current active presentation.

The display further includes, for each listed presentation, presentation function buttons corresponding to functions of renaming, duplicating, deleting or sending a presentation, respectively.

This display also includes global function buttons allowing to add a new presentation, add a folder in a presentation, or import a presentation.

Master Presentation Creation: Presentation Creation

When a presentation is created (or duplicated from an existing presentation), the program modifies the "profil.xml" file so as to add thereto a new presentation node as described with reference to FIG. 4, and also creates a presentation folder in the local root folder (e.g. C:\MHPS\COCKTAIL\1\ as shown in FIG. 4 if this is the first created presentation), the name of the presentation folder being identical to the presentation ID (in the present species the "1" figure).

The program then reads the master nodal structure ("menu.xml" file) from the storage unit where the master localized versions are present, and copies this master nodal structure to become the "menu.xml" file contained in the "menu" folder of the newly created presentation folder.

This copy of the master nodal structure will be used for defining, under control of the user, the visibility/non-visibility in the final presentation of each content (slide) as pointed to by the master nodal structure.

Figures 7, 8:
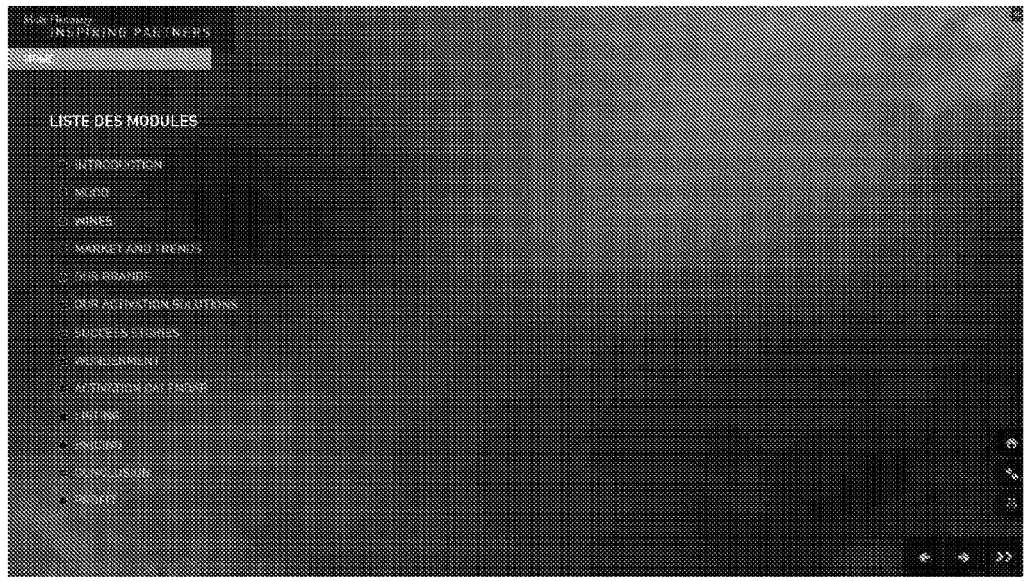
FIG. 7 illustrates another item portion of a XML structure of a presentation, where an item includes sub-items.
FIG. 8 illustrates the user interface of a slide manager for editing/personalizing the structure of a presentation.

The Master Nodal Structure defined by a "menu.xml" file contains a series of item nodes is illustrated in FIGS. 6 and 7. These are located at the lower level in the hierarchy and correspond to respective slides, i.e. individual parts of the presentation. Each item node refers to a master contents belonging to the corresponding master localized version. More particularly, each slide item has a "file" attribute designating the Flash files which are to be loaded and used as design template for the slide in question.

Once the "menu.xml" file has been copied from the relevant master localized version to the presentation folder, it can be used for determining which slides will be included in the presentation and which slides will not belong to the presentation.

In a practical embodiment, and as illustrated in FIG. 6, an item node contains several attributes:

enabled: a tag indicating whether said content (slide) is visible in the personalized presentation or not (values on or off).
file: a name used to identify the master content file to be loaded for the presentation; if the property is set to "no", this means that no master content is available for the considered item node.
duration: a time indicator (e.g. in minutes or seconds) defining for how long Master Content has to be displayed; the presence of this indicator in each item nodes allows the user to evaluate in a very simple manner the total duration of the personalized presentation, practically, the system is capable of dynamically adding the time indicators of each items having an Enabled value set to "on", and of displaying this duration.
label: the name of the Master Content (slide) used as label in the slide manager (cf. infra) and corresponding to the different chapters present in a presentation.
printable: an indicator of whether the Master Content (slide) can be printed from the slide manager or not (cf. infra).

It should be noted that an item node can be the child of another item node, allowing to build hierarchical menus as will be described in the following. And example of item nodes embedded into a parent item node is illustrated in FIG. 7.

According to an advantageous feature, the total duration of the presentation can by dynamically computed and displayed (cf. bottom left corner of FIG. 8) while the user in is the course of enabling/disabling slides.

More particularly, each time a menu item is enabled or disabled by the user according to the above procedure, the program recomputes the sum of the individual durations associated with each menu item. In this manner, the user can adjust the composition of the presentation so that a targeted duration can be achieved.

Structure Editor: Slide Manager

The menu.xml file interacts with a corresponding editor, named "slide manager", which allows easy editing of the Master Nodal Structure associated with the created presentation. The Structure Editor reads the "menu.xml" file and displays it as a hierarchical menu, as illustrated in FIG. 8. Each item can be enabled or disabled by a tick box or by clicking in the zone of the item name.

The "on" or "off" status of an item is further revealed in the display by highlighting the enabled items or graying the disabled items.

Preferably, the change of the Enabled status of an item is automatically propagated to descendent item nodes, together with the display revealing the status.

Further, when the user sets the Enabled status of an item to "on", the corresponding slide is displayed after having read the slide data from the master localized version. Further, the total duration of the presentation as described in the foregoing is updated.

Viewing the Presentation: Launching and Playing a Presentation

When a presentation is launched, the application loads the current presentation "menu.xml" file read from the "menu" folder contained in the presentation folder designated by the appropriate ID (cf. supra). The menu is displayed based on "menu.xml" file first child and the first enabled slide item is played.

Practically, a slide is a .SWF file used as design template. It can be associated to a XML file that provides modified content (e.g. the "00_01_F.xml" file as described in the foregoing).

When a slide item is played, the application loads the SWF files corresponding to the slide item "file" attributes. Once loaded, it checks whether a XML slide content file is located in the local presentation folder, revealing that there is a modified content for this slide.

If so, the application loads the XML slide content and displays it through the SWF file using the SWF original design.

If no XML slide content is found in the local presentation folder, the application searches for one in the Master Localized Version (linked to the presentation by the "profil.xml" definition) and loads it.

If no XML slides content is found (either locally or in the Master Localized Version), the basic SWF content is displayed.

When the user goes to the next slide, the application plays the next enabled slide found in the "menu.xml" slide item.

Slide Personalization—XML Slide Content

According to one aspect of the present invention, a slide may be edited (personalized) by the user during the viewing of the presentation. When a slide is edited/personalized, the corresponding personalized slide content is implemented as a declarative XML file (e.g. the "00_01_F.xml" file as described above) itself referring to different files, and in particular to the master content obtained from the master data, which practically is a SWF template which is supplied with initial content and formatting.

The edition/personalization is preferably done via an appropriate text editor, preferably in what-you-see-is-what-you-get (WYSIWYG) mode.

Of course, the degree of freedom allowed to the user for personalization can be adjusted.

In the present example, the user can modify text content and text style, and substitute an image to another one, or modify some contents in a video (e.g. text portions thereof). To the contrary, the slide layout (background colors, locations of the different items in the slide, etc.) as defined by the design slide template is kept untouched.

An example of a text-type XML slide content is illustrated in FIG. 10. It includes a plurality of "txt" nodes, having "mc" attributes which example of XML Slide Content: the "txt" nodes have "mc" attributes which declare which SWF Movie Clip (SWF structure) the node content is linked to. The data in the "txt" node is in HTML format, allowing rich and flexible layout (presentation options).

Figure 11:
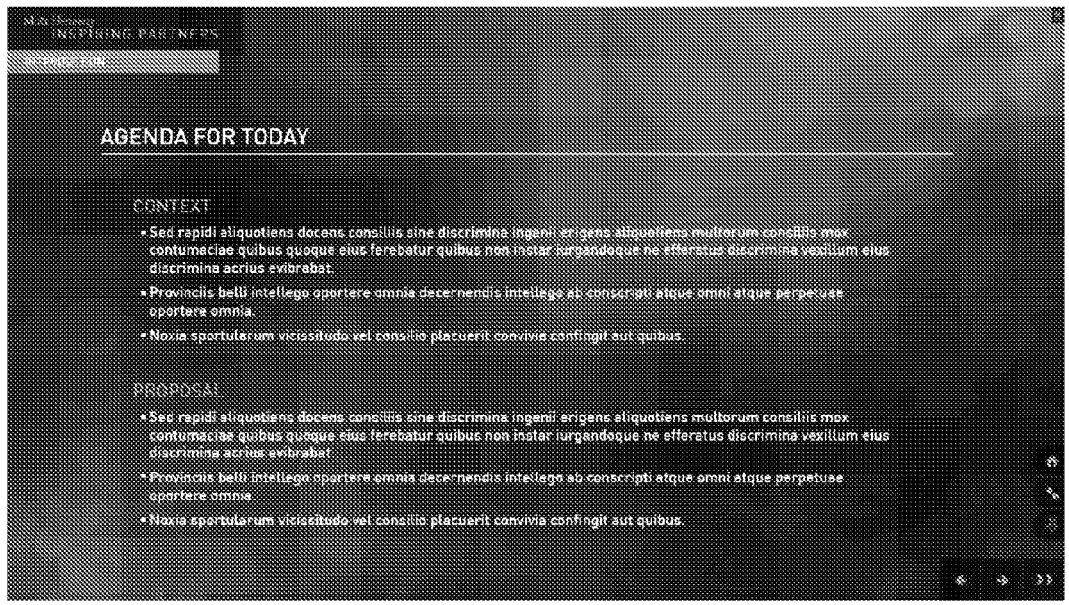
FIG. 11 illustrates the corresponding display during the presentation.

FIG. 11 shows a display generated by the system by interpretation of the XML Slide Content of FIG. 10.

Figures 12A, 12B:
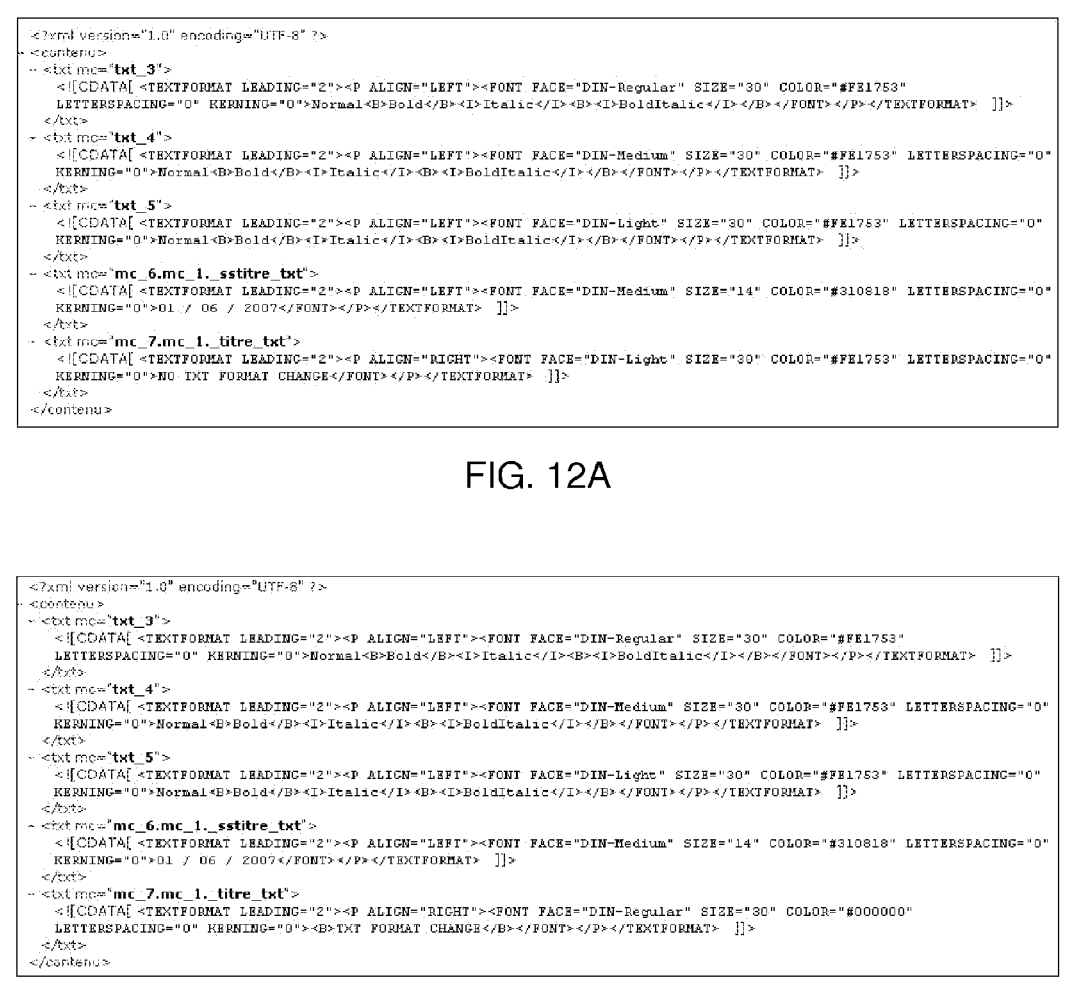

FIGS. 12A and 12B further illustrate that an XML slide content can contain modified text contents (in FIG. 12A, the original text string "CLIENT NAME" in the fifth text item has been replaced with "NO TXT FORMAT CHANGE") and/or modified text style (in FIG. 12B, the text format again in the fifth text item has been changed from FONT FACE="DIN-Light" to FONT FACE="DIN-Regular", and the text content is this time "TXT FORMAT CHANGE").

Details of Presentation Playing

Figure 9:
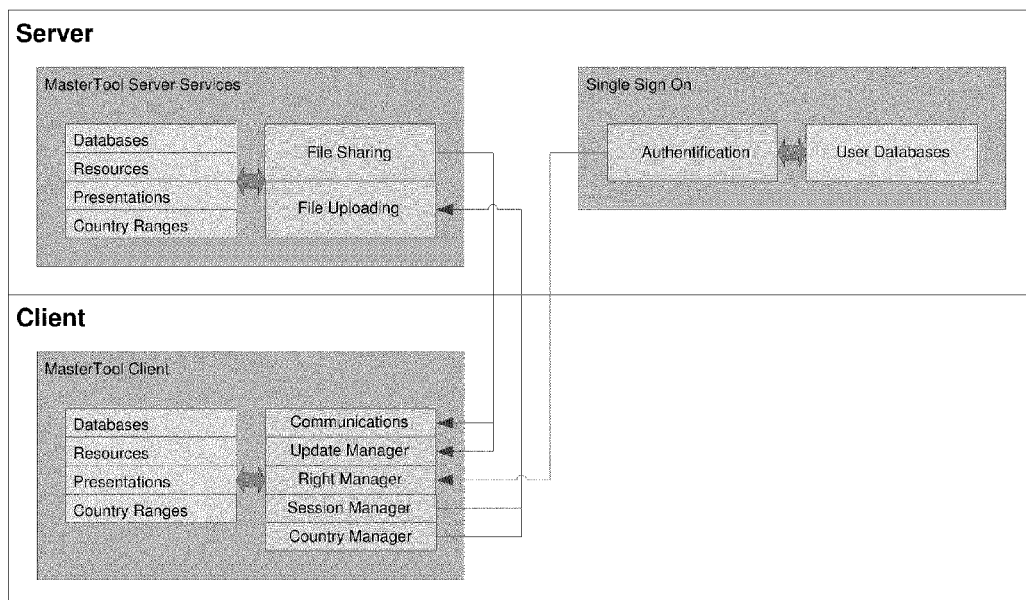
FIG. 9 illustrates the main steps executed for performing a personalized presentation according to the present invention.

FIG. 9 illustrates the different steps executed by the system when performing the presentation.

First of all, the system checks for the presence of an active local presentation on the system hard disk. The profil.xml file allows to determine the current active presentation.

The menu.xml file of this presentation is then parsed. When the system identifies that a menu item Enabled tag is set to "on", it then loads from the master data storage the corresponding template slide file, which contains design information and content data.

Then before reading any content data for presentation, the system checks whether a personalized content exists in the personalized presentation data for this content.

If this step determines that no personalized content exists, then the presentation is performed either with a localized changed content or, if no such content exists, with a master content.

To the contrary, if such personalized content is detected, then the presentation is performed with this personalized content.

These steps are repeated for each menu item, the ones having an Enabled tag set to "off" being merely ignored, and for each successive slide corresponding to the enabled items, whereby the personalized presentation is generated.

Presentation Export

A personalized presentation can be exported by a user for use by a different user having another computer system which can access the same master data, and possible localized data.

For that purpose, the folder organization of a presentation, starting from the presentation root folder, can be assembled in a single file, e.g. by a Zip® type compression software, and transmitted e.g. via direct Internet connection to the central server. In this case, the uploaded file is then verified and approved by central "superuser", which allows said file to be available and downloadable by every authorized user. Files may else be transmitted from a user to another one through traditional means comprising e-mails, removable storage units such as USB keys, and other known systems.

There, an import function of the presentation manager part of the program can use an Unzip piece of software for decompressing the file into the original folder arrangement, store this folder arrangement at the right place under the local root folder, and modify the local "profil.xml" file for making the system aware of this change.

A further characteristic of the program is the possibility for the program administrator to impose a filter regarding the slide contents, so that the user is able to concentrate on the presentation and lets the administrator take care of the local strategy to adopt in the considered region.

More particularly, downloadable media packages, each containing a plurality of master product/service presentations corresponding to products/services available in respective regions, can be provided to the various regional sales entities of a same company, and code limiting access to the master product/service presentation(s) corresponding to said given region can be installed on each salesperson computer.

Dynamic Data Management

The present invention as described in the foregoing can be implemented in a dynamic data management environment.

For instance, a presentation can be further personalized by appropriate user interface displays belonging to the presentation and allowing to select/deselect products, to input price and/or quantity information associated to selected products, etc.

For this purpose, the master data can comprise a master product database including various types of data (description, manufacturing price, recommended retail price, etc.), and this database is exploited for creating in the folder of the active presentation a personalized database in response of appropriate user inputs. Such database is for instance in xml format.

The contents of this database can in turn be dynamically used by various calculation programs forming part of the presentation, so as to take into account only selected products and perform actions such as profit simulation based on quantities and pricing, etc.

Typically, this can be done with listing-type slides where items to be presented or not can be ticked or not by the user building his offer. The system copies the relevant parts of a master product database in xml format belonging to the master data in a specific xml personalization file in the presentation directory, and appropriate tags such as SELECTED/NON SELECTED are updated according to the user's selections.

In the same manner, pricing slides allows to input commercial data (prices, quantities, discounts, etc.) which again are stored under respective tags of the personalization file.

The latter is accessible for any computing to be made in association with the presentation or separately.

Of course, the system can handle different levels of user authorization corresponding to different capacities to personalize the data of the database.

Data Mining

Another optional feature of the system and method of the present invention comprises storing auxiliary data, such as logging the personalization actions made by each user, in a manner known per se in the art of database management.

Such data can then be gathered in real time or according to any schedule for any kind of processing such as commercial analysis or statistics.

Of course, many variants may be brought to the system and method as described in the foregoing.

In particular, other data structures, file types and dynamic presentation software can be used without departing from the scope and spirit of the present invention.

The invention claimed is:

1. A computer system for generating a dynamic presentation, comprising:
   a master storage containing master presentation data having a master nodal structure and master contents associated with content nodes of said structure,
   a structure editor capable of copying said master nodal structure into a personalized data structure in a dedicated read/write storage and of selectively changing the copied master nodal structure into a personalized nodal structure in response to user inputs, wherein said personalized nodal structure comprises all or part of the nodes of the master nodal structure,
   a contents editor capable of copying a master content into said personalized data structure in said dedicated read/write storage and of selectively changing the copied master content into a personalized content in response to user inputs,
   a dynamic presentation generator for generating a personalized presentation by accessing said personalized data structure, determining which content nodes in said structure belong to personalized presentation, and for any such content node selectively accessing master contents or personalized content if the latter is present in said personalized data structure.

2. A computer system according to claim 1, wherein said contents editor and said presentation generator share common display generation tools, whereby said contents editor operates in what-you-see-is-what-you-get mode.

3. A computer system according to claim 1 or 2, wherein said structure editor comprises a display generator for displaying labels of nodes of the master nodal structure and user-input sensitive graphic items associated to each node label for selectively declaring each associated node as enabled or disabled in the personalized nodal structure.

4. A computer system according to claim 3, wherein said master nodal structure comprises a tree structure file where each content node of the structure has an enabled/disabled tag, and wherein the structure editor is capable of changing the tag values depending on the user inputs made on the graphic items.

5. A computer system according to claim 4, further comprising a presentation duration computing unit capable of dynamically adding together duration information associated with each enabled node and of displaying the total duration.

6. A computer system according to claim 3, wherein said master contents include master presentation template data toward which point template pointers associated to structure nodes, and contents data towards which point content pointers associated to said template data, and wherein said presentation generator is capable of accessing master presentation template data pointed by an enabled node, of checking whether a corresponding personalized content is contained in said dedicated storage, if so using said personalized content for the presentation, and if not accessing master content located in the master storage for the presentation.

7. A computer system according to claim 1, wherein said nodal structures and said contents are tag-based arborescent files such as XML files.

8. A computer system according to claim 1, comprising a plurality of personalization data sets, each comprising a personalized nodal structure and personalized contents, and a selector for selecting one among said sets.

9. A computer system according to claim 1, wherein said master storage is a server-based remote medium storage unit, and wherein said dedicated read/write storage is a different storage unit.

10. A computer system according to claim 1, wherein the master storage contains both master presentation data and localized presentation data, so that personalized presentation in different languages can be generated.

11. A computer system according to claim 10, further comprising a language selector for selecting a particular localized nodal structure and localized contents as master nodal structure and contents.

12. A computer system according to claim 11, wherein the system is adapted, for each content intended to belong to a presentation, to first check whether a personalized content exists, if so to use such personalized content, and if not to check whether a localized content exists, if so to use such localized content, and if not to use a master content.

13. A computer system according to claim 1, further comprising a database editor capable of copying at least part of a master database contained in the master presentation data into said dedicated read-write storage and to personalize data of said copied database in response to user inputs, wherein said presentation generator is capable of dynamically using said personalized data for the presentation.

14. A computer system according to claim 1, wherein said dynamic presentation generator comprises a Flash™ type presentation generator.

15. A method for generating a personalized dynamic presentation in a computer system having a master storage containing master presentation data having a master nodal structure and master contents associated to the nodes of said nodal structure, defining together a non-personalized dynamic presentation, said method comprising:
   copying said master nodal structure from said master storage to a personalized data structure contained in a dedicated read/write storage,
   editing said copied structure into a personalized nodal structure in response to user inputs, wherein said personalized nodal structure comprises all or part of the nodes of the master nodal structure,
   for at least one of said nodes, copying a master content to said personalized data structure contained in said dedicated read/write storage,
   editing said copied master content into a personalized content in response to user inputs, and
   generating said personalized dynamic presentation by accessing said personalized data structure, determining which content nodes in said structure belong to the personalized presentation, and for any such content node selectively accessing master contents or personalized content if the latter is present in said personalized data structure.

16. A method according to claim 15, wherein said contents editing and presentation generating steps are performed with common display generation tools, whereby said contents editing is made in what-you-see-is-what-you-get mode.

17. A method according to claim 15 or 16, wherein said structure editing step comprises displaying labels of nodes of the master nodal structure and user-input sensitive graphic items associated to each node label for selectively declaring each associated node as enabled or disabled to the personalized nodal structure.

18. A method according to claim 17, wherein said master nodal structure comprises a tree structure file where each content node of the structure has an enabled/disabled tag, said structure editing step comprising changing the values of said tags in response to user inputs on said graphic items.

19. A method according to claim 17, further comprising a step performed at the time of node enablement/disablement comprising dynamically adding together duration information associated with each enabled node and displaying the total duration.

20. A method according to claim 17, wherein said master contents include master presentation template data toward which point template pointers associated to structure nodes, and contents data towards which point content pointers associated to said template data, and wherein said presentation generating step comprises accessing master presentation template data pointed by an enabled node, checking whether a corresponding personalized content is contained in said personalized data structure and if so, accessing said personalized content for the part of the presentation corresponding to said node and alternatively if not, accessing master content located in the master storage for part of the presentation corresponding to said node.

21. A method according to claim 15, wherein said nodal structures and said contents are tag-based arborescent files such as XML files.

22. A method according to claim 15, wherein said personalized data structure comprises a plurality of personalization data sets, each comprising a personalized nodal structure and associated personalized contents, and further comprising a step of selecting one among said sets prior to the presentation generating step.

23. A method according to claim 15, wherein said master storage is a read-only removable medium storage unit, and wherein said dedicated read/write storage is a different storage unit.

24. A method according to claim 15, wherein the master storage contains both master presentation data and localized presentation data, so that personalized presentation in different languages can be generated.

25. A method according to claim 24, further comprising an initial step of language selection, and a step of a language selector for selecting a particular localized nodal structure and localized contents as master nodal structure and contents.

26. A method for transmitting a personalized dynamic presentation from a first computer system to a second computer system, comprising the steps of:
providing each computer system with a master storage medium containing similar non-personalized dynamic presentation data,
at said first computer system, assembling a personalized data structure generated by the method of claim 16 into a single data package,
transmitting said package from said first computer system to said second computer system via a standard communications process,
at said second computer system, disassembling said single data package into said personalized data structure, and storing said structure in a dedicated read/write storage,
whereby a method according to claim 15 can be performed in said second computer system for generating said personalized dynamic presentation or a similar one from said non-personalized dynamic presentation data and said personalized data structure.

27. A method according to claim 26, wherein said package is uploaded from first computer to a server, and downloaded by said second computer from said server.

28. A computer-based tool for assisting salespersons in the presentation of products/services on offer, comprising:
a storage containing a master product/service presentation including data associated with a number of products/services on offer, said data having a master nodal structure and master contents associated with content nodes of said structure,
an editor for changing the master product/service presentation into a personalized product presentation and for storing in a personalization data set representative of the changes, said editor comprising:
a structure editor capable of copying said master nodal structure into a personalized data structure in a dedicated storage and of selectively changing the copied master nodal structure into a personalized nodal structure in response to user inputs, wherein said personalized nodal structure comprises all or part of the nodes of the master nodal structure,
a contents editor capable of copying a master content into said personalized data structure in said dedicated read/write storage and of selectively changing the copied master content into a personalized content in response to user inputs,
a dynamic presentation generator for reading said master product presentation in said storage and said personalization file in order to generate a personalized presentation for selected products/services, where presentation contents can further be personalized, as entirely defined by the personalization data set.

29. A method for assisting salespersons in the presentation of products/services on offer, comprising:
providing to each salesperson a computer-readable data storage medium containing a master product/service presentation including data associated with a number of products/services on offer, said data having a master nodal structure and master contents associated with content nodes of said structure,
providing to each sales person a computer-based editor for changing the master product/service presentation into a personalized product presentation and for storing in a personalization data set representative of the changes and accessible by said computer, said editor comprising:
a structure editor capable of copying said master nodal structure into a personalized data structure in a dedicated storage and of selectively changing the copied master nodal structure into a personalized nodal structure in response to user inputs, wherein said personalized nodal structure comprises all or part of the nodes of the master nodal structure,
a contents editor capable of copying a master content into said personalized data structure in said dedicated read/write storage and of selectively changing the copied master content into a personalized content in response to user inputs,
providing to each salesperson a dynamic presentation generator for reading said master product presentation in said storage and said personalization file in order to generate a personalized presentation for selected products/services, as entirely defined by the personalization data set.

30. A method according to claim 29, wherein said editor and said presentation generator are provided on said data storage medium for installation on the salesperson computer system.

31. A method according to claim 29 or 30, comprising the following additional steps:
providing to regional sales entity computer-readable data storage media each containing a plurality of master product/service presentations corresponding to products/services available in respective regions, providing the computer systems of salespersons in a given region with code limiting access by the editor and presentation generator to the master product/service presentation corresponding to said given region.

* * * * *

UNITED STATES PATENT AND TRADEMARK OFFICE
CERTIFICATE OF CORRECTION

PATENT NO. : 8,219,914 B2  
APPLICATION NO. : 12/678656  
DATED : July 10, 2012  
INVENTOR(S) : Rauber et al.

It is certified that error appears in the above-identified patent and that said Letters Patent is hereby corrected as shown below:

In the Specifications  
Col. 1, Line 23, "presentations, are" should read -- presentations are --.  
Col. 1, Line 44, "hand are" should read -- hand, are --.  
Col. 2, Line 5, "Nevertheless, The" should read -- Nevertheless, the --.  
Col. 2, Line 43, "non skilled" should read -- non-skilled --.  
Col. 4, Line 4, "quantities" should read -- quantity --.  
Col. 5, Line 13, "user" should read -- users --.  
Col. 6, Line 24, "in a" should read -- in an --.  
Col. 6, Line 27, "of a" should read -- of an --.  
Col. 6, Line 29, "of a" should read -- of an --.  
Col. 7, Line 17, "Flash based" should read -- Flash-based --.  
Col. 7, Line 48, "as a" should read -- as an --.  
Col. 7, Line 61, "invention is based" should read -- invention are based --.  
Col. 9, Line 28, "contains a" should read -- contains an --.  
Col. 11, Line 32, "nodes is" should read -- nodes as --.  
Col. 12, Line 1, "following. And" should read -- following. An --.  
Col. 12, Line 40, "is a" should read -- is an --.

In the Claims  
Claim 27, Col. 17, Line 64, "from first" should read -- from said first --.

Signed and Sealed this  
Twenty-eighth Day of January, 2014

Michelle K. Lee  
*Deputy Director of the United States Patent and Trademark Office*